United States Patent [19]
Scott

[11] 3,760,765
[45] Sept. 25, 1973

[54] MACHINE TOOL INDICATOR MECHANISM

[76] Inventor: Joe Scott, 2800 W. Grand Blvd., Apt. 309, Detroit, Mich. 48202

[22] Filed: Sept. 1, 1971

[21] Appl. No.: 176,964

[52] U.S. Cl. .................... 116/115, 74/813, 90/17
[51] Int. Cl. ............................................. G01p 13/00
[58] Field of Search .............. 116/115, 115.5, 124, 116/133; 74/813, 815, 825; 90/17, 15

[56] References Cited
UNITED STATES PATENTS
1,760,938  6/1930  Edgar .................................. 116/124
3,577,828  5/1971  Stickney ................................ 90/17

Primary Examiner—Louis J. Capozi
Attorney—J. King Harness et al.

[57] ABSTRACT

An improved machine tool indicator mechanism adapted for retrofitting on a machine tool such as a milling machine, the milling machine having a rotatable shaft for displacing a work support relative to a tool carrying head or vice versa, the indicator mechanism comprising a pair of scales for translating the rotational movement of the shaft to an axial traveled distance relative to a fixed point, and including means for independently zeroing the scales at any given displaced position.

17 Claims, 6 Drawing Figures

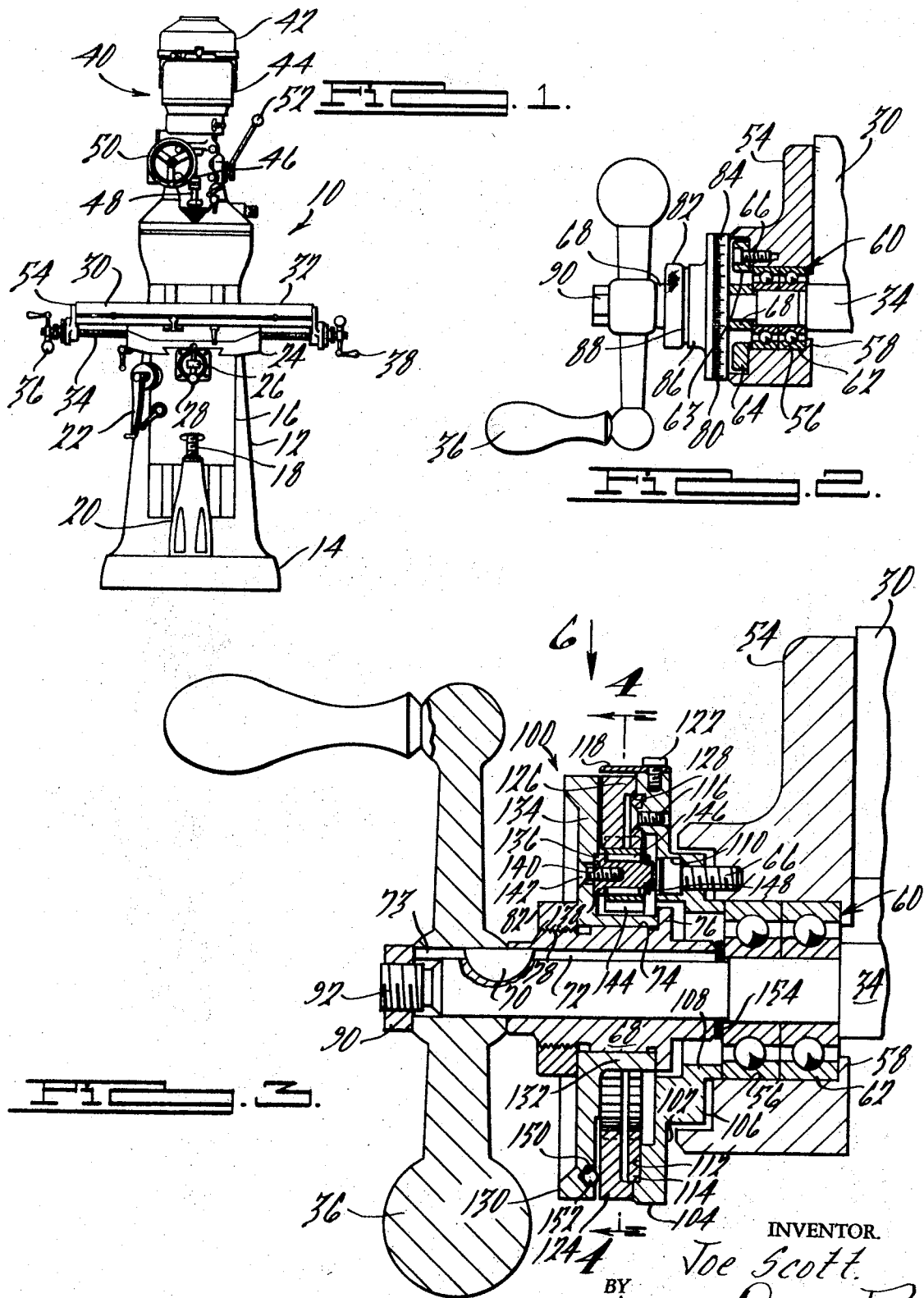

INVENTOR.
Joe Scott.
BY Harness, Dickey & Pierce
ATTORNEYS

MACHINE TOOL INDICATOR MECHANISM

BACKGROUND AND SUMMARY OF THE INVENTION

This invention relates generally to movement indicating devices, and more particularly to a machine tool indicating mechanism adapted for use with a machine tool such as a milling machine having a table movable by rotation of a feed screw, the indicating mechanism translating the rotational movement of the feed screw to provide the axial distance displaced by the table.

Generally speaking, a typical milling machine, or like type of machine tool, is conventionally provided with a single graduated dial disposed on a disc adjacent an operating handle, the operating handle being adapted to rotate a feed screw which in turn produces table travel. Conventionally, the graduated disc is suitably indexed to incrementally translate one revolution of the feed screw, i.e., the lead, which provides an expedient measure of the displacement should the desired table travel be within a limit produced by one revolution thereof. In most instances, however, the desired table travel exceeds the lead which compels the machine operator to physically calculate and thereafter mentally count off the number of revolutions, the calculations being based on the pitch of the feed screw which will be adapted to provide the desired table travel. By displacing the table in this manner it has been found that the calculations are tedious and subject to arithmetic miscalculation, and thereafter the number of revolutions are subject to miscounting, resulting in undercutting or overcutting the work stock contributing to needless waste of the work stock and loss of production and profit.

In U. S. Pat. No. 1,760,938, a micrometer device was disclosed which circumvented the above problem by utilization of a pair of rotatable scales. A first scale was adapted to make one revolution per each revolution of the shaft, and a second scale was adapted to make one revolution in association with the maximum travel of the movable member, a gear mechanism driving the second scale and being designed to accomplishment of the latter result. The problem, however, associated with the above described device resides in the fact that each unit requires special adapter fittings, individually designed gear mechanisms, and a multitude of dials based upon the individual requirements of any special machine. From a commercial standpoint, the customizing aspect has been found to be uneconomical and particularly impractical with respect to existing machines wherein the space limitations have already been established and wherein special adapter fittings would be required for retrofitting with the existing machine parts.

The subject invention is addressed to a movement indicating mechanism which is adapted to be retrofitted in conjunction with any conventional feed mechanism, and which is adapted to utilize most of the basic parts commonly associated therewith. Additionally, the subject mechanism may be mass produced which provides a unit which is commercially acceptable and accessible to all users of machine tools.

It is therefore the primary object of the subject invention to provide a movement indicating mechanism which is adapted to be easily retrofitted in an existing machine tool and which is adapted to utilize the majority of the basic components normally associated with conventional single dial type indices previously described.

It is another object of the subject invention to alleviate the need of counting or calculating rotational movements of a rotatable shaft, such as a feed screw, to determine the precise location of a movable member relative to a fixed point.

It is still another object of the subject invention to provide a novel and improved indicating mechanism having a direct reading of the extent of movement of one member relative to another.

It is yet another object of the subject invention to provide an indicating mechanism in which the scales may be independently zeroed for any given position of the member whereby readings may be taken from such random positions.

It is still another object of the subject invention to provide an indicating mechanism which may be easily and economically retrofitted to an existing machine tool alleviating down time of the machine.

It is a further object of the subject invention to provide an indicating mechanism which is adaptable for mass production, is precise in operation, and economical to manufacture.

Other advantages of the present invention will become apparent from a consideration of the following detailed description taken in conjunction with the accompanying drawings.

BRIEF DESCRIPTION OF THE DRAWINGS

FIG. 1 is an exemplary side elevation of a turret miller having a milling attachment and including a movable table, the table being selectively displaced in three mutually perpendicular directions by a vertical, longitudinal, and cross feed assembly;

FIG. 2 is an enlarged fragmentary elevation of the left end of the movable table of the turret miller of FIG. 1 illustrating the construction of a conventional indicator mechanism;

FIG. 3 is an enlarged fragmentary cross section, similar to FIG. 2, illustrating the preferred position indicator mechanism of the subject invention retrofitted in conjunction with the movable table and associated components thereof.

DETAILED DESCRIPTION OF THE PREFERRED EMBODIMENT

Figure 4:
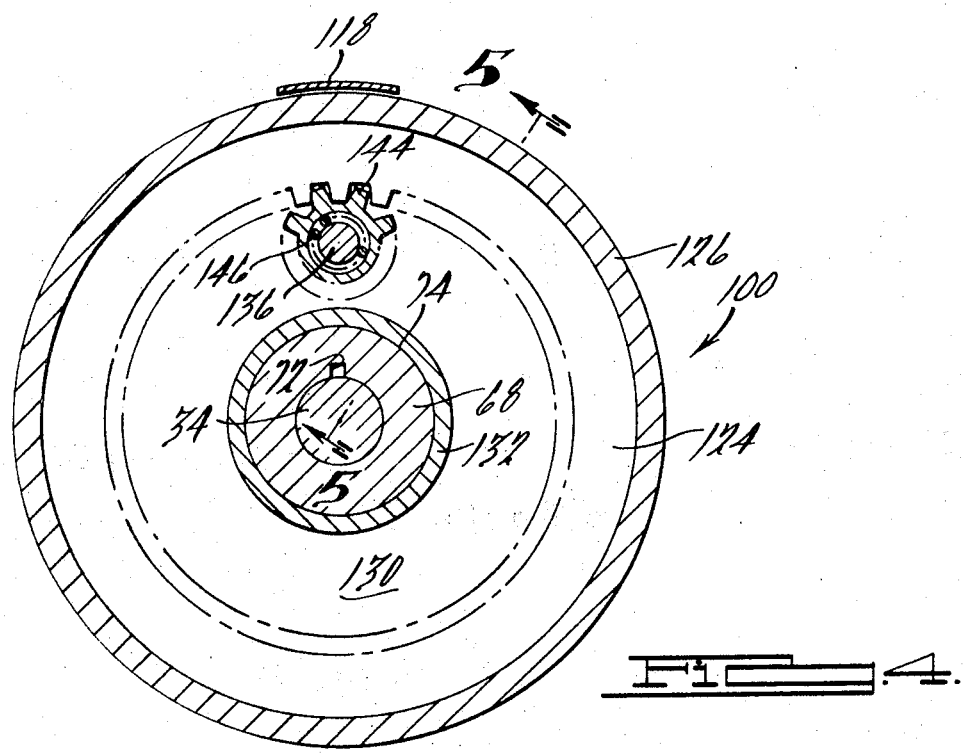
FIG. 4 is a transverse cross-sectional elevation of the indicator mechanism of FIG. 3 taken along the line 4—4 thereof.

With reference now to FIG. 1 of the drawings, a turret miller is indicated generally at 10, the miller being exemplary of a machine tool having a member which may be selectively displaced relative to a fixed point. As shall herein-after become apparent, however, the indicating mechanism of the subject invention is adaptable for use with any machine wherein the extent of movement of one member with respect to another is desired, such tools comprising lathes, boring machines and various other types of milling machines, wherein a cutting tool or the like may be selectively displaced relative to a stationary table or alternatively, a movable table displaced relative to a cutting tool.

The exemplary turret miller 10 is comprised of a column 12 supported on its lower end by a base member 14, the base member 14 extending outwardly from the column 12 as viewed in FIG. 1. A knee member 16 is slidably supported on the outer face of the column 12 and is adapted for vertical travel by an elevating feed screw 18. The lower end of the feed screw 18 is threadably engaged to a generally bottle shaped jack 20, the lower end of the jack 20 being supported by the upper surface of the base member 14. For selectively raising or lowering the knee member 16, an operating handle 22 is provided which is connected to a suitable mechanism (not shown) adapted to provide rotation to the feed screw 18.

A saddle 24 is slidably connected to the upper surface of the knee member 16 and adapted for transverse horizontal movement therewith by means of a cross feed screw 26 rotatable by an operating handle 28. A table 30, having an accurately machined surface 32 on which a workpiece may be clamped or supported by a suitable vice or fixture, is longitudinally slidably connected to the upper surface of the saddle 24 and adapted for longitudinal movement therewith by means of a longitudinal feed screw 34. The longitudinal feed screw 34 is adapted to be rotated from either opposite longitudinal end of the table 30 by means of operating handles 36 and 38, each handle being connected to an end of the feed screw 34. As is now apparent, the table 30 may be displaced relative to the column 12 in three mutually perpendicular directions, such displacement being accomplished by selective rotation of the elevating feed screw 18, the cross feed screw 26, and the longitudinal feed screw 34. It will thus be appreciated that a suitably clamped workpiece connected to the table 30 is adapted for machining by suitable displacement in one of three directions by an appropriate cutting or grinding tool connected to a turret assembly 40 which will hereinafter be explained.

The turret head assembly 40 is movably supported by the upper end of the column 12 and includes a suitable prime mover 42 drivingly connected to a transmission 44. The transmission 44 includes a drive shaft 46 connected to a spindle 48, the spindle 48 having a suitable bore for receiving an appropriate arbor (not shown). For providing increased versatility, the turret assembly 40 is adapted to be swiveled or rotated relative to the longitudinal and transverse axis of the table 30 by manipulation of operating handles 50 and 52. The indicator mechanism of the subject invention is addressed to an indexing means for selectively displacing the table 30 relative to a fixed selective position of the turret assembly 40.

For purposes of explanation the subject invention will be described in conjunction with the longitudinal feed screw 34, and more particularly with the indexing means and the operating handle 36 located at the left end thereof as viewed in FIG. 1. As best observed in FIG. 2, the conventional construction includes an end support bracket 54 connected by any suitable means, such as screws, bolts, or the like, to the vertical face of the table 30. The bracket 54 includes a cylindrically shaped bore 56 having an annular lip 58 disposed on its inward axial end. The longitudinal feed screw 34 is rotatably supported in the bore 56 by a bearing assembly 60, the assembly 60 being restrained from inward axial movement by abutment of an outer race 62 with the lip 58. The opposite axial end of the outer race 62 is restrained from outward axial movement by engagement with a cylindrically shaped lug portion 63 of an annular ring shaped member 64, the member 64 being connected to the end bracket 54 by any suitable connecting means such as bolts, screws or the like 66.

A dial mounting hub 68, illustrated in cross section in FIG. 3, is connected for rotation with the feed screw 34 by a key member 70 suitably located in a keyway 72, the key member 70 also connecting a keyway 73 disposed in the operating handle 36. The outer annular surface of hub 68 includes an axially extending mounting portion 74 interposed between a radially extending flange portion 76 and a threaded portion 78. A dial indexing member 80 is located on the mounting portion 74 and adapted to rotate therewith by a locknut 82 threadably engaged to the threaded portion 78 and urging the member 80 against the outer radial surface of the flange 76 to provide a frictional engagement. The dial indexing member 80 includes a plurality of circumferentially spaced graduations 84 for incrementally translating one revolution of the feed screw 34 in accordance with the pitch thereof. The indexing member 80 further includes a hub portion 86 having a flat radially shaped outer face 88 adapted to engage an inward surface of the locknut 82. The operating handle 36 is axially retained on the outer end of the longitudinal feed screw 34 by means of a suitable nut 90 threadably engaged to a threaded portion 92 located on the outer end of the feed screw 34.

For conventional operation, the locknut 82 is initially threadably disengaged to permit zeroing of dial indexing member 80, the disengagement permitting the member 80 to rotate freely relative to mounting hub 68. Upon proper rotational positioning with respect to a zero graduation, the locknut 82 is threadably tightened to restore frictional contact with hub 68 and the member 80. The dial indexing member 80 will now rotate with the feed screw 34 relative to the table 30, the table 30 being displaced a distance corresponding to the lead of the feed screw 34 per each revolution thereof. It shall be noted that if the desired axial travel of the table 30 exceeds the axial distance of the lead, such desired distance and rotational movement of the operating handle 36 must be calculated in accordance with the pitch thereof, and manually counted, as subsequent revolutions exceed the capacity of the dial indexing member 80. Consequently, a miscalculation or miscount of the number of revolutions of the operating handle 36 will provide a serious error in the machining of the workpiece. The indicating mechanism of the subject invention is adapted to prevent such an error.

With reference now to FIGS. 3, 4, 5 and 6, a machine tool indicator mechanism is generally indicated at 100, and adapted to replace the dial indexing member 80 and the annular ring 64 of the conventional construction illustrated in FIG. 2, and utilize the remaining members associated therewith. The indicating mechanism 100 is comprised of a generally annular shaped bearing retaining disc 102 which is adapted for retrofitting in place of the annular ring 64 of the conventional construction. The retaining disc 102 includes a radially extending flange portion 104 projecting outwardly from a relatively thickened hub portion 106, and an axially extending, cylindrically shaped bearing retainer portion 108, the portion 108 adapted to engage the bore 56 of the end bracket 54 and engage the outer race 62 of the bearing assembly 60. For connecting the mounting disc 102 to the end bracket 54, a plurality of axially extending counter bores 110 are suitably spaced in conformance with the threaded bores disposed in the end bracket 54 and adapted to receive the bolts, screws or the like 66 previously utilized in retaining the annular ring 64. The flange portion 104 includes an annular shoulder 112 adapted too receive a stationary internal gear member 114 and be connected therewith by suitable bolts, screws, or the like 116, the gear member 114 being relatively thicker than the axial depth of the shoulder 112 and projecting axially outwardly therefrom. As best observed in FIGS. 3 and 5, a suitable window member 118 which includes a scribe line 120 is connected to the outer peripheral surface of the flange portion 104 by means of suitable bolts, screws, or the like 122. The function of the scribe line 120 will hereinafter be explained in conjunction with the operation of the indicator mechanism 100.

A rotatable internal gear 124 having an axially extending, cylindrically shaped support portion 126 is rotatably supported on the projecting portion of the stationary gear 114, the internal gear 124 having at least one, more or less teeth than the stationary gear 114. The internal gear 124 is ring shaped and the supporting portion 126 defines an inward annular surface 128 of slightly larger diameter than the diameter of the stationary gear 114 to permit relative rotation therebetween. The outer peripheral face of the annular gear 124 is inscribed with a plurality of suitably spaced graduations, the purpose and function of which shall be explained in conjunction with the operation of the indicating mechanism 100.

Figure 6:
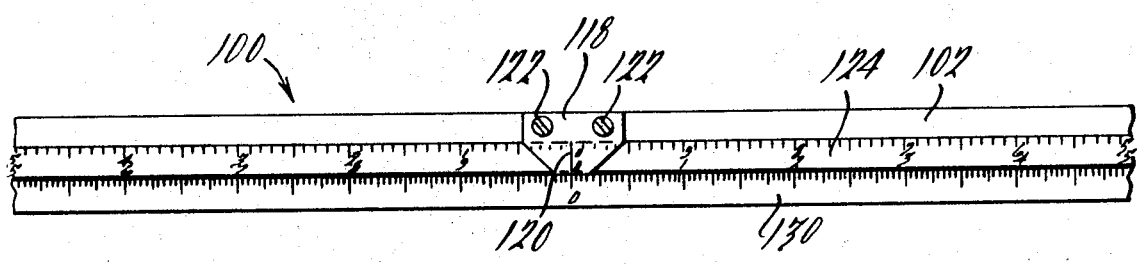
FIG. 6 is a plan view of the scale of the indicator mechanism illustrated in FIG. 3 projected in a unitary plane and taken in the direction of the arrow 6 thereof.

Rotatably supported on the dial mounting hub 68 and disposed to the left of the second internal gear 124 as viewed in FIGS. 3 and 6, is a rotatable annular disc member 130. The annular disc 130 is comprised of an axially extending hub portion 132 rotatably supported on the mounting portion 74 of the dial mounting hub 68, and a radially extending, annular shaped, flange portion 134 projecting outwardly from an outer end of the hub portion 132. A pinion shaft 136 having an enlarged head 138 located in an axial counterbored passage 140 in the flange portion 134, is eccentrically connected therein by means of a suitable bolt, screw or the like 142. The pinion shaft 136 supports a pinion gear 144, the gear 144 being rotatably supported on the shaft 136 by a bearing assembly 146 and axially retained thereon by a retainer ring 148. As best observed in FIGS. 3 and 4, the pinion gear 144 is drivingly connected and in mesh with both the stationary gear 114 and the internal gear 124. The disc member 130 is adapted to be rotated with the mounting hub 68 by threadably rotating the locknut 82 to provide a frictional engagement therewith, rotation of the locknut urging the inward end of the hub portion 132 against the outer surface of the flange 76. To inhibit an interference on the opposite inward face of the flange 134, a plurality of plastic ball members 152 are located in complementary bores 150, the bores 150 being suitably radially spaced in the inward face of the flange 134 to engage the outer face of the internal gear 124. The outer periphery of the flange portion 134 is also inscribed with a plurality of circumferentially spaced graduations as will hereinafter be explained in conjunction with the operation of the indicator mechanism 100.

For retrofitting the machine tool indicator mechanism 100 to the end bracket 54 of the table 30, the conventional dial indexing member 80 and the annular retaining bearing ring 64 must be removed. To facilitate the removal, the nut 90 which secures the operating handle 36 to the end of the feed screw, is threadably disengaged and the operating handle 36 is slidably removed. The locknut 82 is then threadably disengaged from the dial mounting hub 68 which permits slidable withdrawal of both the mounting hub 68 and the dial indexing member 80. Once the dial indexing member 80 has been removed, access can be had to the bolts 66 which secure the annular ring 64 to the end bracket 54. The bolts 66 are threadably disengaged and the annular ring 64 removed. The machine tool indicating mechanism 100 of the subject invention may now be retrofitted to the longitudinal feed screw 34.

The bearing retainer disc 102, preferably having the stationary gear 114 preassembled thereon, is connected to the end bracket 54 by threadably reengaging the bolts 66 until the outer face 62 of the bearing assembly 60 is firmly axially seated against the lip 58 of the end bracket 54. To assure frictional engagement between the end of the hub portion 132 of the annular disc member 130 and the flange 76 of the mounting portion 74, while retaining adequate axial rotational clearance between the complementary rotatable surfaces of the internal gear 124 with the stationary gear 114 and retaining disc 102, one or more ring shaped spacer members 154 are inserted around the longitudinal feed screw 34 in abutment with the inner race of the bearing assembly 60, the spacers 154 adapted to slightly axially displace the reassembled position of the dial mounting hub 68. The dial mounting hub 68 is then reengaged to the longitudinal feed screw 34 by means of the key member 70, and the rotatable internal gear 124 and annular disc member 130 are assembled thereon. To complete the reassembly, the locknut 82 is threadably engaged to the dial mounting hub 68 and the handle reinstalled, the handle 36 again being keyed to the longitudinal feed screw 34 by means of the key member 70 and axially retained thereon by the nut 90.

Each of the dial scales of the indicator mechanism 100 may now be set at zero by unthreading the locknut 82 a sufficient distance to axially withdraw the pinion gear 144 from engagement with the stationary gear 114, in this position it will be appreciated that the internal gear 124 may be physically rotated to align the zero index with the scribe line 120. The outer annular disc 130 is then physically rotated until its zero graduation also aligns with the scribe line 120 of the window 118. Upon mutual alignment of the zero indices the pinion gear 144 is reengaged to the stationary gear 114 and the locknut 82 is then hand tightened to frictionally reengage the annular disc member 130 to the dial mounting hub 68. It will now be appreciated that rotation of the feed screw 34 facilitated by the operating handle 36 will mutually rotate the annular disc member 130 and additionally provide a means for rotating the internal gear 124 relative to the stationary gear by virtue of the driving connection with the pinion gear 124. Additionally, it will be appreciated that displacement of the table 30 relative to the column 12 is dependent and physically related to the rotational movement of the feed screw 34. Also, during the operation of the turret miller 10, it will be noted that the indicating mechanism 100 has an inherent capability of being zeroed at any given position of the table 30.

Turning now to the gearing and graduations on the dial indices, the parameters of each are established relative to the pitch or lead of the longitudinal feed screw 34. In the exemplary embodiment of the turret miller 10, illustrated in FIG. 1, the pitch of the longitudinal feed screw 34 was five threads per inch, and the lead was 0.200 inch. To complement The pitch, the rotatable internal gear 124 was selected to have 50 teeth, the number of teeth for simplicity being selected as a multiple of the pitch. As was previously indicated, the stationary gear 114 was selected to have at least one, more or less teeth than the internal gear 124 for purposes of either advancing or retarding the relative rotational movement by a radial distance conforming too the circular pitch of the teeth thereof. In the present instance, therefore, the stationary gear 114 may have 49 or 51 teeth, the former number of teeth causing the internal gear 124 to advance relative to the stationary gear 114 or be retarded therewith should the latter number of teeth be selected. Either combination, however, being adaptable to displace the second annular gear 124 a circumferential distance conforming to the circular pitch upon one revolution of the feed screw 34 relative to the scribe line 120 of the window 118.

Figure 5:
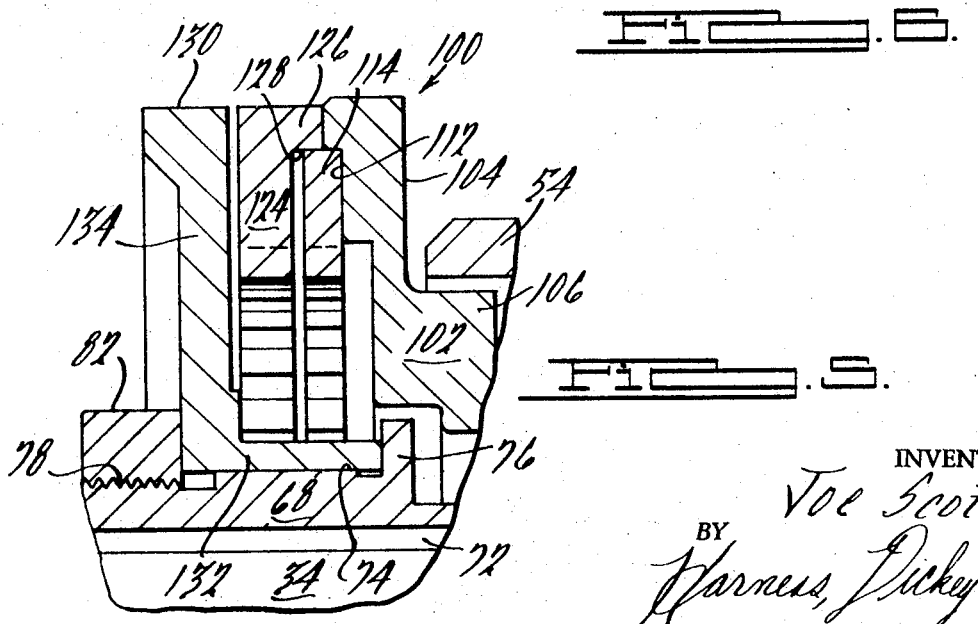
FIG. 5 is a partial transverse cross-sectional elevation of the mechanism illustrated in FIG. 4 taken along the line 5—5 thereof.

With reference now to FIG. 5 of the drawings, the scales located on the disc 130 and on the internal gear 124 are illustrated relative to the scribe line 120. First considering the scale disposed on the disc 130, it will be noted that this scale is adapted to rotate directly with the feed screw 34 and axially displace the table in one revolution thereof a distance conforming to the lead, i.e., 0.200 inch. To devise this scale into a thousandths dial, it is therefore necessary to provide 200 graduations, each graduation radially spaced at 1.8° apart. The dial scale disposed on the internal gear 124 on the other hand, is adapted to read each half turn of the feed screw 34 providing an inch index and therefore is divided into a hundred equally radially spaced increments, each increment being spaced 3.6 degrees from an adjacent increment. Since the inch dial has the capability of reading a half turn, the 1,000ths dial is numerically divided in two-zero to 100 quadrants, each quadrant complementary a half turn graduation on the inch dial.

For illustrating the utility of the above indicated scales, assume that the table 30 is to be longitudinally traversed towards the axis of the spindle 48, a distance of 2.568 inches. For such displacement, the operating handle 36 is rotated in a clockwise direction until the graduation corresponding to 2.5 is coincident with the scribe line 120. The operating handle is then rotated until the graduation on the 1,000ths dial corresponding to 18 is under the scribe line 120 of the window 118 and in this position the machine operator is assured that the table 34 has been displaced the selected distance.

It shall be noted that the machine tool indicating mechanism 100 of the subject invention is easily retrofitted and adapted to be assembled with any conventional machine tool wherein it is desired to selectively displace a first member relative to a second member, or fixed point. It will also be noted that in retrofitting, the mechanism 100 utilizes a majority of the parts normally associated with conventional movement indicating devices. Also as evidenced in the above illustration, the indicating mechanism 100 is exceptionally easy to read in selectively positioning the table 30 and is easily reset to zero at any given position thereof.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination with a machine tool having a rotatable shaft for displacing a first member relative to a fixed point, and wherein the shaft is rotatably supported by a bearing assembly located in an outer surface of the first member, and projects outwardly therefrom, an indicator mechanism comprising: a bearing retainer disc detachably connected to said first member and having an axially extending lug portion forming a shoulder for axially locating said bearing assembly; a first indexing disc rotatably supported by said bearing retainer disc; a second indexing disc supported for rotation with said shaft; and means for incrementally rotating said first indexing disc relative to the rotation of said second indexing disc.

2. The combination, as set forth in claim 1, wherein the indicator mechanism further comprises a first internal gear connected to said retainer disc, wherein said first indexing disc is a second internal gear, and wherein said means includes a pinion gear eccentrically rotatably supported by said second indexing disc, said pinion gear being in driving cooperation with both of said first and second internal gears.

3. The combination, as set forth in claim 2, wherein said second internal gear has at least one more teeth than said first internal gear for advancing the movement of said first indexing disc relative to said first internal gear.

4. The combination, as set forth in claim 2, wherein said second internal gear has at least one less teeth than said first internal gear for retarding the movement of said first indexing disc relative to said first internal gear.

5. The combination, as set forth in claim 2, wherein said means further includes a shaft having one end connected to said second indexing disc and a bearing located on said shaft and rotatably supporting said pinion gear.

6. The combination, as set forth in claim 1, wherein said second indexing disc includes a plurality of circumferentially spaced openings located on a radially extending surface adjacent said first indexing disc, and wherein the indicator mechanism further comprises a ball member located in each of said spaced openings.

7. The combination, as set forth in claim 1, wherein the rotatable shaft is a feed screw and said second indexing disc includes a plurality of equally spaced first graduations for translating the lead of the feed screw.

8. The combination, as set forth in claim 7, wherein said first indexing disc also includes a plurality of equally spaced second graduations, said second graduations being a function of the number of revolutions of said second indexing disc.

9. In combination with a machine tool having a feed screw for displacing a first member relative to a fixed point and wherein one end of the feed screw is rotatably supported by the first member and projects therefrom, a dial mounting hub connected to the end of the feed screw and having an axially extending mounting portion interposed between a radially extending flange portion and a threaded portion, and a locknut threadably engaged to the threaded portion, an indicator mechanism comprising: a stationary disc connected to the first member; a first indexing disc rotatably supported by said stationary disc; a second indexing disc having a hub portion rotatably supported by the mounting portion of the dial mounting hub and selectively frictionally secured therewith in response to threadably engaging said locknut; and means for incrementally rotating said first indexing disc relative to the rotation of said second indexing disc.

10. The combination, as set forth in claim 9, wherein the indicator mechanism further comprises a first internal gear connected to said stationary disc, said first indexing disc is a second internal gear, and said means includes a pinion gear eccentrically rotatably supported by said indexing disc, said pinion gear being in driving cooperation with both of said first and second internal gears.

11. The combination, as set forth in claim 10, wherein said second internal gear has at least one more teeth than said first internal gear for advancing the movement of said first indexing disc relative to said first internal gear.

12. The combination, as set forth in claim 11, wherein said second internal gear has at least one less teeth than said first internal gear for retarding the movement of said first indexing disc relative to said first internal gear.

13. The combination, as set forth in claim 9, wherein the feed screw is rotatably supported by a bearing assembly including an inner and an outer race, the outer race of said bearing assembly being radially supported by the first member, and wherein said stationary disc axially supports the outer race of said bearing assembly.

14. The combination, as set forth in claim 13, further including at least one annular shaped spacer member supported by the feed screw and interposed between the bearing assembly and one end of the dial mounting hub for axially locating said mechanism relative to said first member.

15. In combination with a machine tool having a feed screw for displacing a first member relative to a fixed point, an end bracket having a bore and connected to one end of the first member, a bearing assembly located in the bore and supporting one end of the feed screw, a bearing retaining member connected to the end bracket, a dial mounting hub connected to the feed screw having an axially extending mounting portion interposed between a flange portion and a threaded portion, an indicating dial located on the mounting portion, a locknut threadably engaged to the threaded portion for frictionally engaging the indicating dial to the mounting hub, and an operating handle connected to the end of the feed screw, an indicator mechanism adapted to be retrofitted on the dial mounting hub in replacement of the bearing retaining ring and the indicating dial, the indicator mechanism comprising: a bearing retainer disc having an axially inwardly extending hub in engagement with the bearing assembly and a circumferentially extending shoulder, said disc being detachably connected to the end bracket; a first internal gear located in said shoulder and detachably connected to the bearing retainer disc; a second internal gear rotatably supported by said first internal gear and having one more or less teeth than said first internal gear, said internal gear further including a plurality of equally spaced first graduations on an integral outer peripheral surface thereof; an indexing disc having a plurality of equally spaced second graduations on an integral outer peripheral surface and a hub portion rotatably supported by the mounting portion of the dial mounting hub; and a pinion gear eccentrically rotatably mounted in an inner radial face of said indexing disc and in driving cooperation with said first and second internal gears, whereby for each rotation of the feed screw said second internal gear will be rotated relative to said first internal gear.

16. The combination, as set forth in claim 15, further comprising a window member having a scribe line connected to the outer peripheral surface of said bearing retainer disc.

17. An indexing mechanism for a machine tool having a work support and a tool carrying head relatively displaceable in response to rotation of a feed screw rotatably supported by an anti-friction bearing assembly carried by said support, the mechanism comprising: a dial mounting hub mounted for rotation with the feed screw, and including a radially extending flange and a threaded section spaced axially from said flange; a mounting disc detachably connected to said support; a first internal gear connected to said mounting disc; a second internal gear supported for rotation relative to said first gear and having a different number of teeth than said first gear, said second gear having a plurality of circumferentially spaced graduations on an integral outer peripheral surface; a dial member having a plurality of circumferentially spaced graduations on an integral outer peripheral surface and including an axially extending annular shaped section slidably located on said mounting hub, said section having an end portion located adjacent said flange of said hub and an opposite end located adjacent said threaded section; a locknut threadably engaged on said threaded section for frictionally connecting and disconnecting said dial member and said hub; and a pinion gear eccentrically located relative to the axis of said feed screw and rotatably supported by said dial member, said pinion gear being drivingly engaged to both of said first and second internal gears.

\* \* \* \* \*